(12) United States Patent
Kim et al.

(10) Patent No.: US 8,009,245 B2
(45) Date of Patent: Aug. 30, 2011

(54) BACKLIGHT, BACKLIGHT ASSEMBLY, LIQUID CRYSTAL DISPLAY HAVING THE SAME AND METHOD THEREOF

(75) Inventors: Gi Cherl Kim, Yongin (KR); Young Keun Lee, Cheonan (KR)

(73) Assignee: Samsung Electronics Co., Ltd. (KR)

( * ) Notice: Subject to any disclaimer, the term of this patent is extended or adjusted under 35 U.S.C. 154(b) by 231 days.

(21) Appl. No.: 11/873,647

(22) Filed: Oct. 17, 2007

(65) Prior Publication Data

US 2008/0088769 A1 Apr. 17, 2008

(30) Foreign Application Priority Data

Oct. 17, 2006 (KR) ........................ 10-2006-0100937

(51) Int. Cl.
*G02F 1/1335* (2006.01)
(52) U.S. Cl. ............ 349/65; 349/61; 362/612; 362/800; 345/82; 345/83; 345/87; 345/102; 345/207; 250/200
(58) Field of Classification Search ............... 349/61, 349/68, 65, 106; 362/612, 231, 249, 800; 445/23; 356/73; 345/82, 83, 87, 207, 76, 345/77, 102; 250/200
See application file for complete search history.

(56) References Cited

U.S. PATENT DOCUMENTS

| 7,052,152 | B2 | 5/2006 | Harbers et al. | |
|---|---|---|---|---|
| 7,638,754 | B2 * | 12/2009 | Morimoto et al. | 250/226 |
| 2005/0135441 | A1 | 6/2005 | Ng et al. | |
| 2006/0044234 | A1 | 3/2006 | Shimonishi | |
| 2007/0170449 | A1 * | 7/2007 | Anandan | 257/98 |
| 2008/0024076 | A1 * | 1/2008 | Korcharz et al. | 315/308 |

FOREIGN PATENT DOCUMENTS

| JP | 9062201 | 3/1997 |
|---|---|---|
| JP | 10049074 | 2/1998 |
| JP | 2003195783 | 7/2003 |
| JP | 2005091526 | 4/2005 |
| JP | 2006059605 | 3/2006 |
| KR | 1020000051328 A | 8/2000 |
| KR | 200399727 | 10/2005 |
| KR | 1020060081801 A | 7/2006 |
| KR | 1020060083616 A | 7/2006 |

* cited by examiner

*Primary Examiner* — Thoi V Duong
(74) *Attorney, Agent, or Firm* — Cantor Colburn LLP

(57) ABSTRACT

A backlight, a backlight assembly and a liquid crystal display having the same, the backlight including a substrate with a plurality of wiring provided thereon, a plurality of LED modules disposed on the substrate and at least one color sensor disposed on the substrate. The color sensor includes a color sensor chip mounted on the substrate and a molding portion enclosing the color sensor chip on the substrate.

15 Claims, 11 Drawing Sheets

BACKLIGHT, BACKLIGHT ASSEMBLY, LIQUID CRYSTAL DISPLAY HAVING THE SAME AND METHOD THEREOF

This application claims priority to Korean Patent Application No. 2006-0100937, filed on Oct. 17, 2006, and all the benefits accruing therefrom under 35 U.S.C. §119, the contents of which are incorporated by reference herein in its entirety.

BACKGROUND OF THE INVENTION

1. Field of the Invention

The present invention relates to a backlight, a backlight assembly and a liquid crystal display having the same, and more particularly, to a backlight, a backlight assembly and a liquid crystal display having the same, wherein a color sensor in a bare chip state is mounted together on a substrate with a package type or bare chip type light emitting diode ("LED") device mounted thereon, so that the color sensor can sense output light of the LED device to control the luminance and color (e.g., color temperature) of the output light of the LED device.

2. Description of the Related Art

Since a liquid crystal display ("LCD") is not self-luminescent, there is a disadvantage in that the visibility of the LCD is lowered in a dark place. Thus, the LCD includes an illumination apparatus such as a backlight. Although a cold cathode fluorescent lamp ("CCFL") may be used as a light source, the use of LED devices with long life span, low power consumption, lightweight and thin characteristics has increased. Such LED devices emit white light using a plurality of LED chips capable of emitting light with different wavelengths.

There exists a disadvantage in that optical characteristics (e.g., light outputs) of the LED chips are changed depending on changes in an input current and an ambient temperature. Thus, a packaged color sensor is positioned outside a light source so as to sense a light output of an LED device, and the output of the light source is controlled in accordance with the sensed results of the packaged color sensor.

Since the packaged color sensor is mounted in a peripheral region of the light source, there are many limitations on a mounting space. Moreover, the color sensor causes a difference in the sensing efficiencies of the color sensor depending on mounting positions. In addition, since the expensive packaged color sensor is mounted in the peripheral region outside the light source through an additional mounting process, there is a problem in that manufacturing costs of an LCD increases.

BRIEF SUMMARY OF THE INVENTION

An exemplary embodiment provides a backlight, a backlight assembly and a liquid crystal display ("LCD") having the same, wherein a color sensor in a bare chip state is mounted on a substrate of backlight and then molded, so that light sensing efficiency thereof can be enhanced without any limitation on a mounting space.

An exemplary embodiment provides a backlight including a substrate with a plurality of wiring disposed thereon, a plurality of LED modules disposed on the substrate, and at least one color sensor disposed on the substrate. The color sensor has a color sensor chip mounted on the substrate and a molding portion enclosing the color sensor chip. The plurality of wiring includes a first wiring electrically connected to at least one of the LED modules and a second wiring separated form the first wiring electrically connected to the color sensor chip.

In an exemplary embodiment, the first wiring may be disposed on a first surface of the substrate and the second wiring may be disposed on a second surface of the substrate opposed to the first surface.

In an exemplary embodiment, the color sensor chip may be electrically connected to the second wiring through wire bonding or bump bonding.

In an exemplary embodiment, the color sensor chip may include red, green and blue light sensing portions sensing red, green and blue light, respectively.

In an exemplary embodiment, the plurality of LED modules may be electrically connected to one another through the plurality of wiring of the substrate. Each of the LED modules may include at least one red, green and blue LED chip, a housing including the red, green and blue LED chips mounted therein, and a plurality of lead terminals connected to the red, green and blue LED chips and extending outside the housing to be electrically connected to the plurality of wiring of the substrate.

In an exemplary embodiment, the plurality of LED modules may be electrically connected to one another through the plurality of wiring of the substrate. Each of the LED modules may include at least one red, green and blue LED chip mounted on the substrate, and an LED chip molding portion enclosing the red, green and blue LED chips.

An exemplary embodiment provides a backlight including a substrate with a plurality of wiring provided thereon and a plurality of chip modules disposed on the substrate. Each of the chip modules includes an LED chip unit having red, green and blue LED chips disposed on the substrate, a color sensor chip mounted on the substrate and a molding portion enclosing and securing the LED chip unit and the color sensor chip with the substrate. The plurality of wiring includes a first wiring electrically connected to the red LED chip, a second wiring electrically connected to the green LED chip, a third wiring electrically connected to the blue LED chip and a fourth wiring electrically connected to the color sensor ship.

In an exemplary embodiment, the red, green and blue LED chips and the color sensor chip may be electrically connected to the wiring of the substrate through wire bonding or bump bonding.

An exemplary embodiment provides a backlight assembly including a plurality of backlights having a substrate and a plurality of LED modules emitting light on the substrate, an accommodating member accommodating the backlights, and at least one color sensor provided in at least one of the plurality of backlights. The color sensor includes a color sensor chip mounted on the substrate, and a molding portion enclosing the color sensor chip.

In an exemplary embodiment, the backlight assembly may further include a power supply supplying power to the LED modules and a controller controlling the power supply depending on an output of the color sensor.

An exemplary embodiment provides a backlight assembly including a backlight having a substrate, a plurality of LED modules emitting light and a color sensor provided on the substrate, a light guide plate emitting light incident from the backlight, and an accommodating member accommodating the backlight and the light guide plate. The color sensor includes a color sensor chip disposed on the substrate, and a molding portion enclosing the color sensor chip.

In an exemplary embodiment, the backlight assembly may further include a power supply supplying power to the LED modules and a controller controlling the power supply depending on an output of the color sensor.

An exemplary embodiment provides a liquid crystal display ("LCD") including an LCD panel displaying images thereon, and a backlight assembly radiating light onto the LCD panel. The backlight assembly includes a plurality of backlights each of which has a substrate and a plurality of LED modules emitting light provided on the substrate. At least one color sensor including a color sensor chip mounted on the substrate and a molding portion enclosing the color sensor chip is provided in at least one of the plurality of backlights.

In an exemplary embodiment, a method of forming a backlight assembly for a liquid crystal display includes forming a plurality of backlights, each of the backlights including a substrate and a plurality of LED modules emitting light, forming a color sensor including a color sensor chip mounted on the substrate and a molding portion enclosing the color sensor chip, disposing a color sensor on at least one of the plurality of backlights and receiving the plurality of backlights into an accommodating member.

BRIEF DESCRIPTION OF THE DRAWINGS

The above and other objects, features and advantages of the present invention will become apparent from the following description of exemplary embodiments given in conjunction with the accompanying drawings, in which.

DETAILED DESCRIPTION OF THE INVENTION

Figure 1:
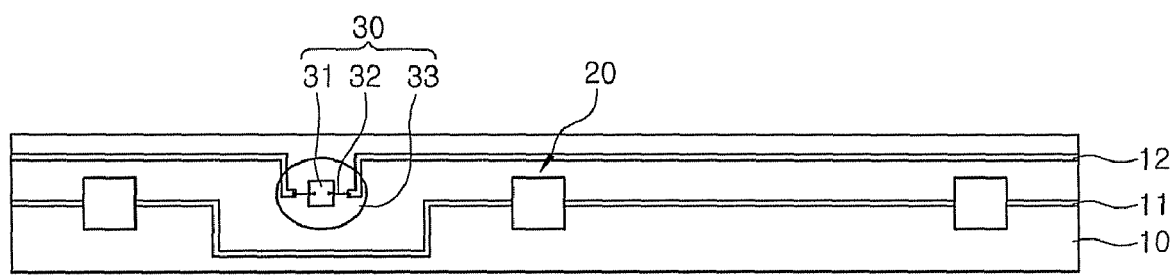
FIG. 1 is a plan view showing an exemplary embodiment of a backlight according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, preferred exemplary embodiments of the present invention will be described in detail with reference to the accompanying drawings. However, the present invention is not limited to the exemplary embodiments but may be implemented into different forms. These exemplary embodiments are provided only for illustrative purposes and for full understanding of the scope of the present invention by those skilled in the art.

Figure 2:
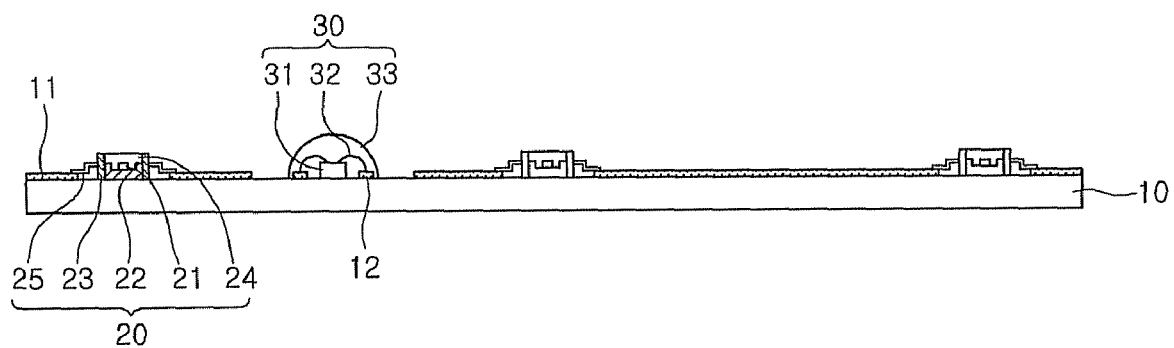
FIG. 2 is a cross-sectional view showing the backlight of FIG. 1 according to the present invention.

FIG. 1 is a plan view showing an exemplary embodiment of a backlight according to the present invention, and FIG. 2 is a cross-sectional view showing the backlight of FIG. 1 according to the present invention.

Referring to FIGS. 1 and 2, the backlight includes a substrate 10 provided with first and second wiring portions 11 and 12, a plurality of LED packages 20 mounted on the substrate 10 and connected electrically to one another through the first wiring portion 11, and at least one color sensor 30 provided on the substrate 10. The color sensor 30 includes a color sensor chip 31 mounted on the substrate 10, conductive wiring 32 connecting the color sensor chip 31 to the second wiring portion 12, and a molding portion 33 encapsulating the color sensor chip 31 and the conductive wiring 32. The color sensor chip 31 refers to a color sensor in a bare chip state, which is not subjected to additional packaging.

A printed circuit board ("PCB") in the form of a substantially rectangular bar or plate is used as the substrate 10 in the illustrated embodiment. In an exemplary embodiment, the PCB may include a metal core PCB ("MCPCB") or a PCB made of FR4 material. Alternatively, a power terminal (not shown) receiving external power and a sensing terminal (not shown) transmitting an output of the color sensor 30 to the outside may be provided at both ends of the substrate 10. The external power applied to the power terminal is supplied to the plurality of LED packages 20 through the first wiring portion 11 provided on the substrate 10. The plurality of LED packages 20 may be connected in series and/or in parallel through the first wiring portion 11. The output of the color sensor 30 is supplied to the sensing terminal through the second wiring portion 12.

As shown in FIG. 2, each of the LED packages 20 includes an LED chip 21 for emitting light; a heat slug 22 with the LED chip 21 mounted thereon, a housing 23 provided outside the heat slug 22, an molding portion 24 encapsulating the LED chip 21; and lead terminals 25 connected to the LED chip 21 and exposed outside the housing 23. In exemplary embodiments, the LED package 20 may include red, green and/or blue LED chips. White light may be emitted through the mixing of red, green and blue light emitted from the LED chips 21. Alternatively, the LED package 20 may include a white LED chip for emitting white light instead of the red, green and/or blue LED chips. In an exemplary embodiment, the heat slug 22 may be omitted.

The plurality of LED packages 20 are mounted on the aforementioned substrate 10. As in the illustrated embodiment, the plurality of LED packages 20 mounted on the substrate 10 are connected in series through the first wiring portion 11. That is, a positive lead terminal 25 of one LED package 20 is connected to a negative lead terminal 25 of another LED package 20 through the first wiring portion 11. A positive or negative lead terminal, respectively, of each of LED packages 20 provided at outer edges (e.g., ends) of the substrate 10 is connected to the power terminal through the first wiring portion 11. In an exemplary embodiment, the lead terminal 25 may be connected to a certain pad provided on the first wiring portion 11.

As illustrated in FIGS. 1 and 2, the color sensor 30 includes the color sensor chip 31, conductive wiring 32 and the molding portion 33. In one exemplary embodiment, a wire may be used as the conductive wiring 32. In the illustrated embodiment, the bare chip type color sensor chip 31 is mounted on the substrate 10, and the color sensor chip 31 and the second wiring portion 12 are then connected electrically to each other using the conductive wiring 32 (e.g., wires) as shown in FIGS. 1 and 2. In an exemplary embodiment, the color sensor chip 31 may be molded, such as using a transparent resin to form the color sensor 30 on the substrate 10. The color sensor 30 may be mounted in a region between two adjacent LED packages 20 of the plurality of LED packages 20.

Since a relatively small-sized color sensor chip 31 is mounted on the substrate 10 in the illustrated embodiment, there is essentially no spatial limitation. In exemplary embodiments, a size of the color sensor chip 31 may be about 350 microns (μm) by about 350 microns (μm) to 1 millimeter (mm) by about 1 millimeter (mm). An interval between adjacent LED packages 20 (e.g., between outer edges) may vary depend on the light output efficiency of the LED package 20 and/or the number of LED packages 20 to be mounted on the substrate. In one exemplary embodiment, an interval is about 10 mm or more. Since the size of the color sensor chip 31 is relatively small compared to the interval between adjacent LED packages 20, the color sensor chip 31 can be sufficiently mounted on a space between of the LED packages 20. In exemplary embodiments, portions of the first and second wiring portions 11 and 12 in a region of the substrate 10 provided with the color sensor 30 be bent as shown in FIG. 1, such as profiled to fit around or corresponding to the color sensor 30.

In the illustrated exemplary embodiment, the color sensor chip 31 is configured to sense red, green and blue light. The color sensor chip 31 includes red, green and blue light sensing portions for sensing red, green and blue light, respectively. The color sensor chip 31 receives white light in which red, green and blue light of the LED package 20 are mixed with one another, and then senses the intensity (e.g., amount) of each of the red, green and blue light within the white light. The color sensor chip 31 outputs different output currents from the respective red, green and blue light sensing portions in accordance with the sensed results.

In the illustrated embodiment, the operation of the LED package 20 is controlled by analyzing changes in the output currents of the color sensor chip. Red, green and blue light is sensed using a single color sensor chip 31 provided with a plurality of light sensing portions. In one exemplary embodiment, a plurality of output terminals may be provided at each of the light sensing portions of the color sensor chip 31. Each of the plurality of output terminals may be connected to the sensing terminal of the substrate 10 through the second wiring portion 12. In an exemplary embodiment, a plurality of color sensor chips may be mounted to sense red, green and/or blue light. A color sensor chip for sensing red light, a color sensor chip for sensing green light and a color sensor chip for sensing blue light may be mounted separately.

Next, a backlight assembly having the aforementioned backlight will be described with reference to the accompanying drawings.

Figure 3:
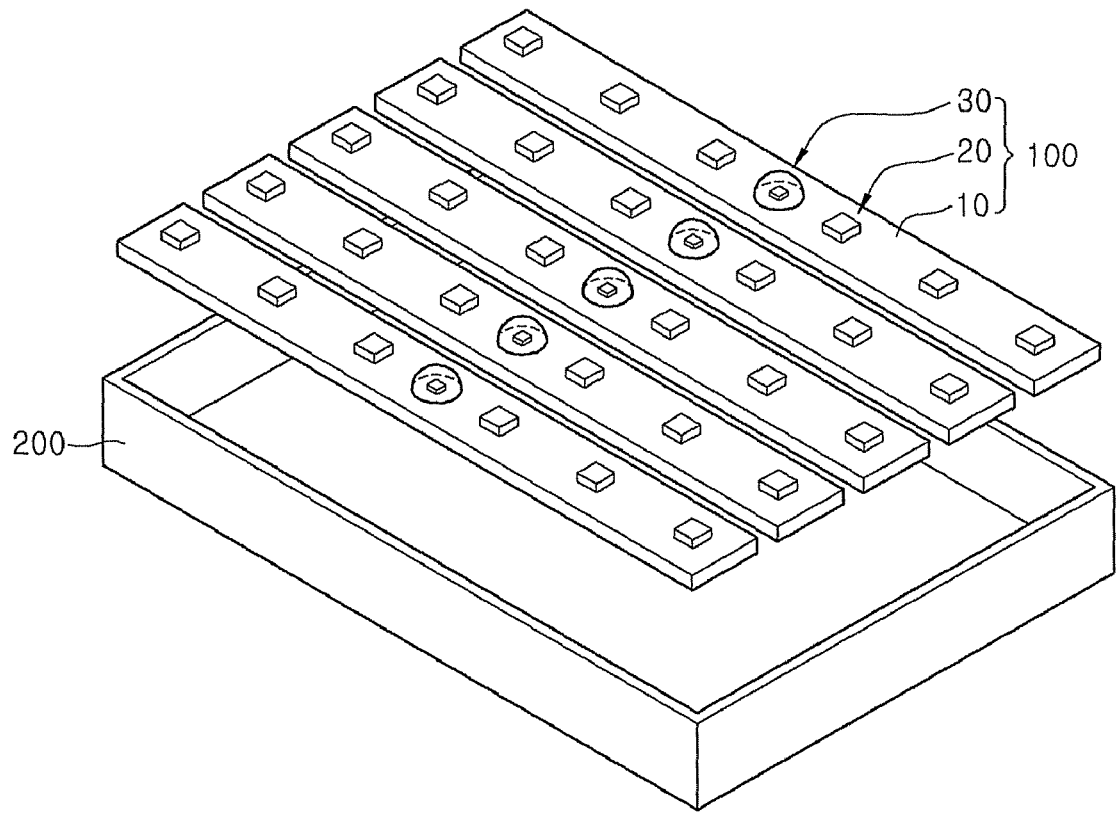
FIG. 3 is an exploded perspective view schematically showing an exemplary embodiment of a backlight assembly according to the present invention.
Figure 4:
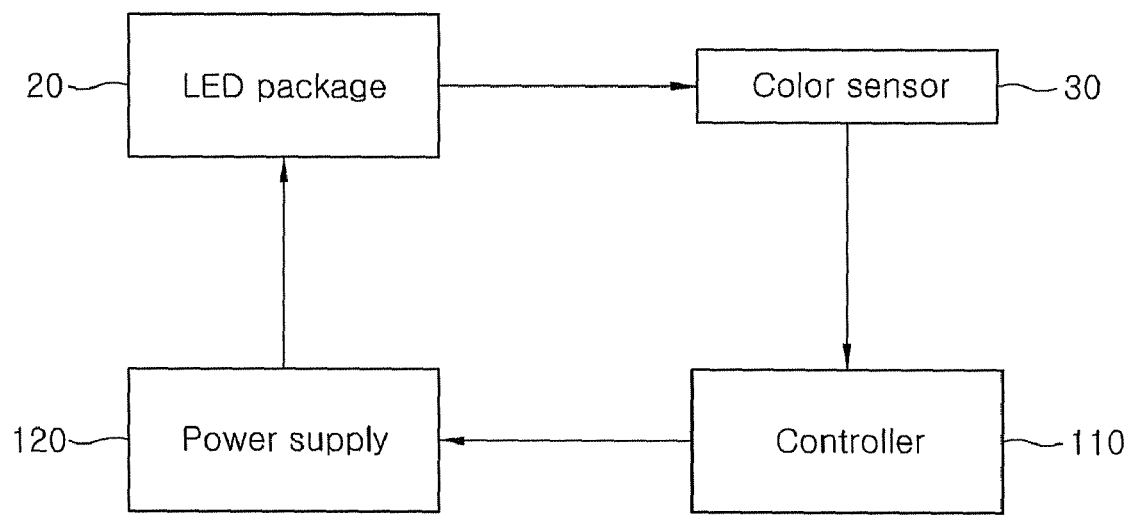
FIG. 4 is a diagram illustrating an exemplary embodiment of an operation of backlight assembly according to the present invention.
Figure 5:
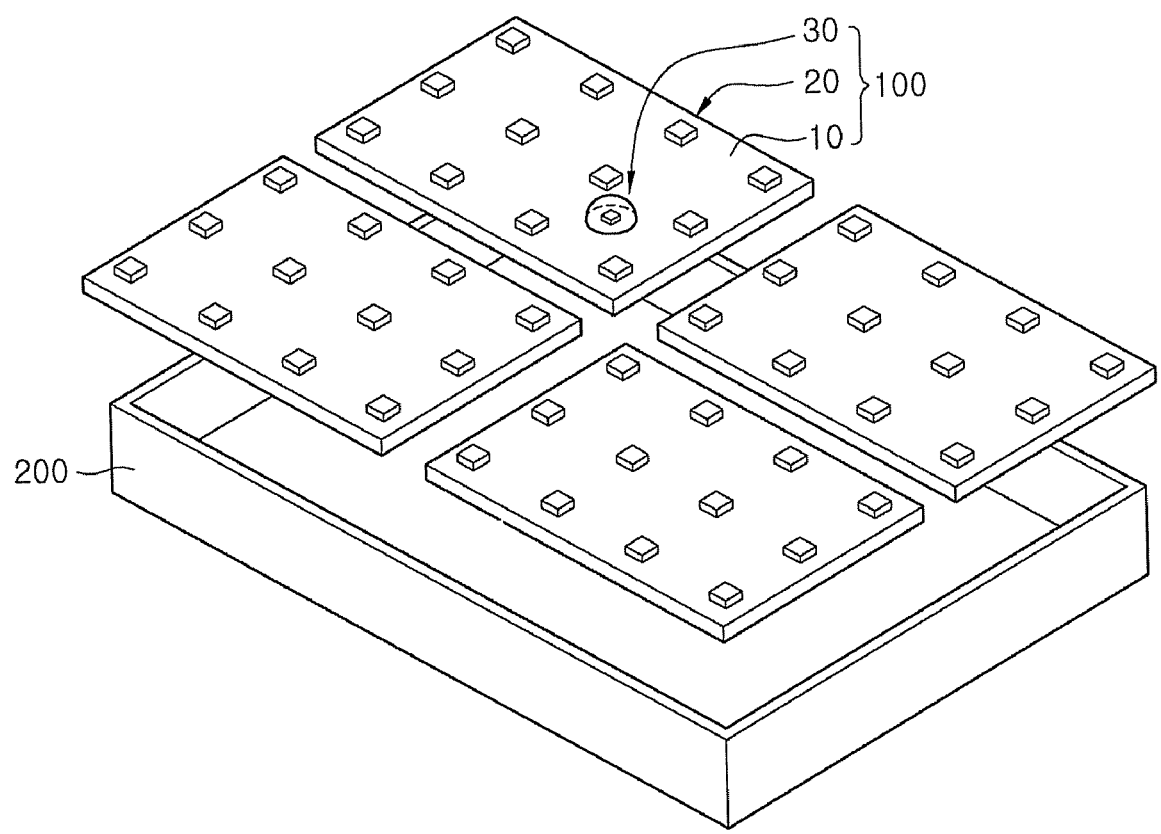
FIGS. 5 and 6 are exploded perspective views schematically showing exemplary embodiments of the backlight assembly of FIG. 3 according to the present invention.
Figure 6:
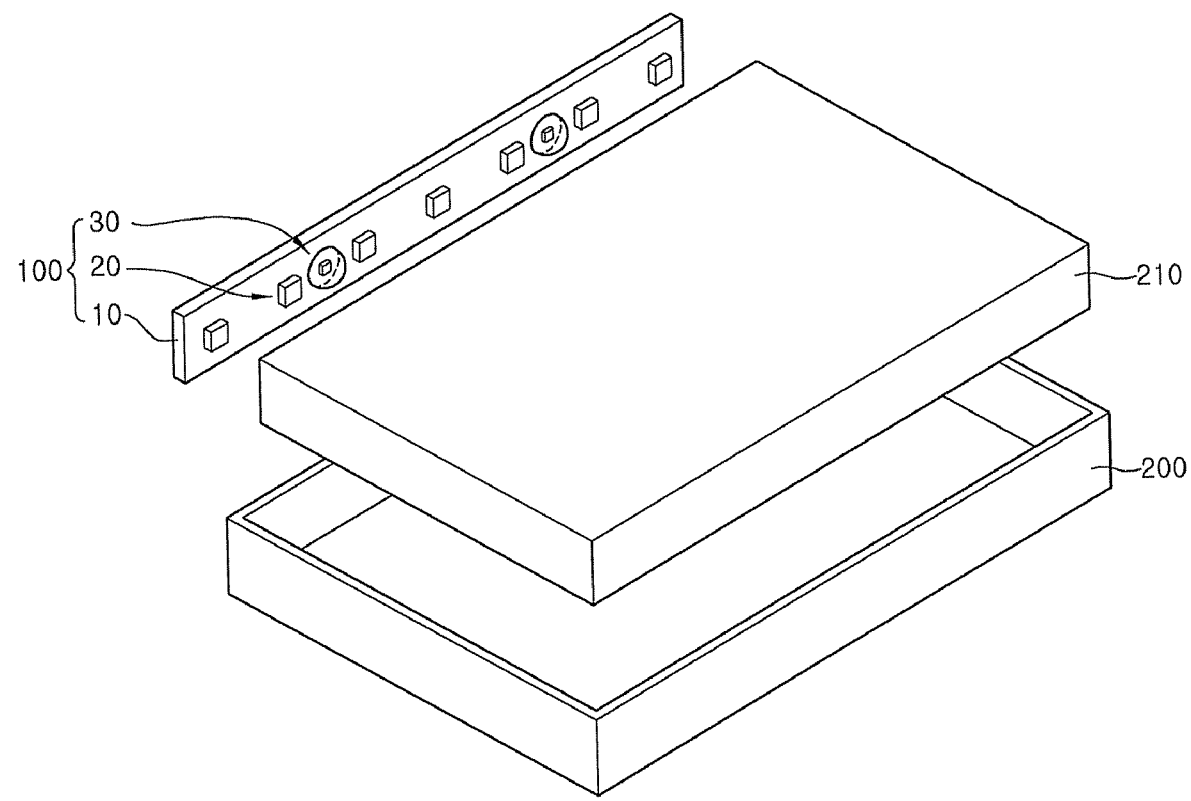

FIG. 3 is an exploded perspective view schematically showing an exemplary embodiment of a backlight assembly according to the present invention, FIG. 4 is a diagram illustrating an exemplary embodiment of an operation of the backlight assembly according to the present invention, and FIGS. 5 and 6 are exploded perspective views schematically showing exemplary embodiments of the backlight assembly of FIG. 3 according to the present invention.

Referring to FIGS. 3 and 4, the backlight assembly in includes a plurality of backlights 100 and an accommodating member 200 receiving the plurality of backlights 100. Each of the backlights 100 includes a substrate 10, a plurality of LED packages 20 and a color sensor 30 provided on the substrate 10. In the illustrated embodiment, the color sensor 30 includes a bare chip type color sensor chip 31 mounted on the substrate 10 and a molding portion 33 for encapsulating the color sensor chip 31.

The backlight assembly further includes a power supply 120 supplying power to the plurality of LED packages 20 of the backlights 100, and a controller 110 controlling the power supply 120 as depending on an output of the color sensor 30. In an exemplary embodiment, a reflection plate may be provided beneath the backlights 100 (e.g., on a side of the backlights 100 towards the accommodating member 200), and/or a plurality of optical sheets may be provided above the backlights 100.

The plurality of LED packages 20 within the backlight 100 of the illustrated embodiment receive power supplied from the power supply 120 to emit white light in which red, green and blue light are mixed. For example, red, green and blue LED chips are provided in the LED package 20, and the respective red, green and blue LED chips independently emit light that in turn is mixed to generate white light. The power supply 120 supplies power to the red, green and blue LED chips so as to emit red, green and blue light, respectively.

An intensity of each of the red, green and blue light may be changed due to an external factor, such as temperature, resulting in changes in the color temperature and light emitting amount of white light obtained by mixing the red, green and blue light. An intensity and/or supply period of a current supplied from the power supply 120 may be changed to vary the intensity of each of the red, green and blue light emitted from the LED package 20. Where the color temperature and light emitting amount of the mixed white light is changed due to an external factor, power that is the output of the power supply 120 may be changed thereby constantly maintaining the color temperature and light emitting amount of the mixed white light.

In the illustrated exemplary embodiment, the color sensor 30 is provided on the substrate 10 with the LED packages 20 mounted thereon so as to sense the amount of mixed white light emitted from the plurality of LED packages 20. The color sensor 30 may sense the amount of each of red, green and blue light within the mixed white light. At least one color sensor 30 may be manufactured without essentially no limitation on a mounting space by mounting and molding the color sensor chip 31 on the substrate 10 as described above. In exemplary embodiments, the color sensor chip 31 in may directly receive mixed white light emitted from the LED packages 20 to sense the amount of the white light, and/or may also receive mixed white light emitted from the LED packages 20 and reflected by external elements (e.g., a lower accommodating member, a reflection plate, an optical plate and upper structures) to sense the amount of the white light.

The color sensor chip 31 generates a plurality of output currents varying depending on the amounts of the respective red, green and blue light within mixed white light emitted from the LED packages 20. The color sensor 30 supplies the output currents to the controller 110 through the second wiring portion 12.

The controller 110 senses changes in the output currents and generates control signals accordingly. The controller 110 converts the plurality of output currents into control voltages and generates control signals in response to the control voltages. In one exemplary embodiment, where a plurality of color sensors 30 are provided, control signals are generated using a mean value of output currents of the color sensors 30. Since the controller 110 has a look-up table, a corresponding control signal is generated according to a corresponding control voltage.

Alternatively, the output currents may be used as they are without converting the output currents into the control voltages.

The output currents include first, second and third currents according to the amounts of red, green and blue light, respectively. The controller 110 receives the first to third output currents and converts them into first to third control voltages, respectively. Thereafter, the controller 110 compares the values of the first to third voltages with set values in the look-up table and generates first to third control signals respectively corresponding thereto.

The controller 110 provides the generated control signals to the power supply 120 to control the output power of the power supply 120 (e.g., an input current to be provided to the LED packages 20).

A method of controlling optical feedback of the backlight assembly of the illustrated exemplary embodiment will be described by way of example as follows.

Hereinafter, a case where the amounts of red and green light are increased and the amount of blue light is decreased within mixed white light due to an external factor will be explained. The color sensor 30 senses mixed white light to generate output currents respectively corresponding to the increases in the amounts of red and green light and the decrease in the amount of blue light. The color sensor 30 generates first and second output currents larger than those corresponding to the amounts of normal red and green light, and generates a third output current smaller than that corresponding to the amount of normal blue light.

The controller 110 converts the first to third output currents of the color sensor 30 into first to third control voltages, respectively. The first and second control voltages are larger than normal values, and the third control voltage is smaller than a normal value. The controller 110 generates first to third control signals respectively corresponding to the converted first to third control voltages. The power supply 120 decreases the amounts of currents of power for respectively enabling the light emission of the red and green LED chips according to the first and second control signals, and increases the amount of a current of power for enabling the light emission of the blue LED chip according to the third control signal. Advantageously, it is possible to decrease the light emitting amounts of the red and green LED chips and to increase the light emitting amount of the blue LED chip.

As in the illustrated embodiment, the backlight assembly includes a plurality of backlights 100 each in the form of a bar as shown in FIG. 3. The bars may be disposed parallel to each other in a longitudinal direction of the backlight assembly. Of course, the present invention is not limited thereto but may be modified variously.

In exemplary embodiments, the backlight assembly may include a plurality of backlights 100 in the form of a plate (e.g., a single member) as shown in FIG. 5. Where there are a plurality of plates backlights 100, at least one color sensor 30 may be provided in at least a portion of the plurality of backlights 100. In one exemplary embodiment, four backlights 100 in the form of a plate may be provided, and at least one color sensor 30 may be provided in one backlight 100 of the plurality of backlights 100 such as is shown in FIG. 5.

In an exemplary embodiment, the backlight assembly may include a backlight 100 including LED packages 20 and color sensors 30, a light guide plate 210 positioned adjacent to the backlight 100, and an accommodating member 200 accommodating the backlight 100 and the light guide plate 210, as shown in FIG. 6. The backlight 100 may be disposed at any of a number of light incident surfaces of the light guide plate 210 and is not limited to one surface as shown in FIG. 6. The light guide plate 210 may be tapered, or wedge-shaped, where the backlight 100 is located at the incident surface of the light guide plate 210, such as at a side surface, a top surface and/or a bottom surface.

Hereinafter, a liquid crystal display ("LCD") having the aforementioned backlight assembly will be described with reference to the accompanying drawings.

Figure 7:
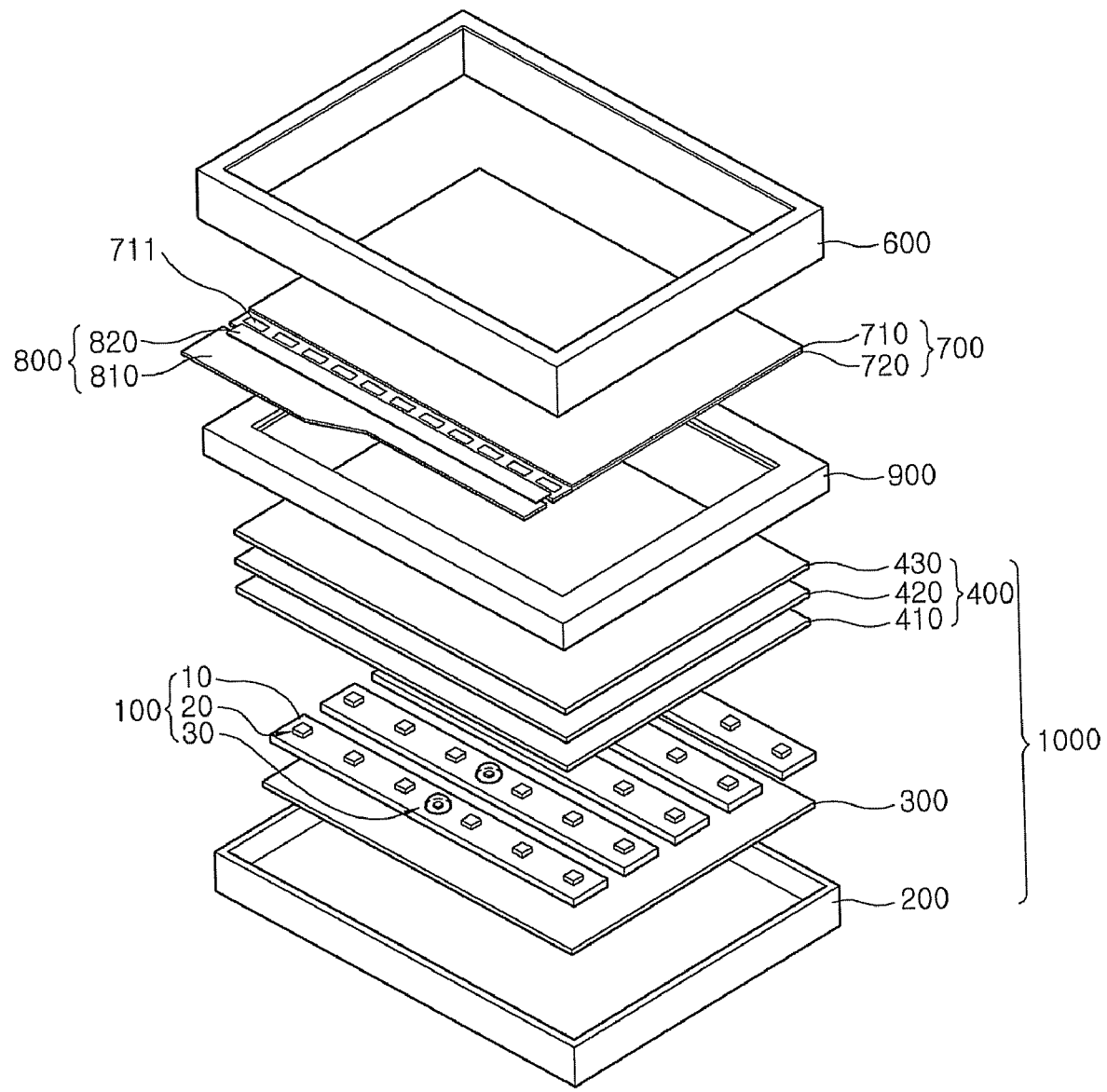
FIG. 7 is an exploded perspective view schematically showing an exemplary embodiment of a liquid crystal display ("LCD") according to the present invention.

FIG. 7 is an exploded perspective view schematically showing an exemplary embodiment of a liquid crystal display ("LCD") according to the present invention.

Referring to FIG. 7, the LCD includes a backlight assembly 1000 having a plurality of backlights 100 with a plurality of LED packages 20 and at least one color sensor 30 mounted thereon, an LCD panel 700, a mold frame 900 and an upper accommodating member 600.

The LCD panel 700 includes a color filter substrate 710 and a thin film transistor ("TFT") substrate 720. A driving circuit unit 800 is connected to one side of the LCD panel 700. The driving circuit unit 800 includes a printed circuit board 810 for receiving external data signals and power signals applied thereto and a flexible printed circuit board 820 for making a connection between the printed circuit board 810 and the LCD panel 700. A control IC 711 for applying data signals to data lines is mounted on the TFT substrate 720 of the LCD panel as shown in FIG. 7. The arrangement of the control IC 711 is not limited thereto but may be mounted on the printed circuit board 810 or the flexible printed circuit board 820. In an exemplary embodiment, a gate stage (not shown) for receiving a gate signal from the printed circuit board 810 to supply the gate signal to gate lines is provided at one side of the TFT substrate 720.

The backlight assembly 1000 in the illustrated embodiment includes a lower accommodating member 200, a reflection plate 300, the plurality of backlights 100 and a plurality of optical sheets 400.

Each of the plurality of backlights 100 includes a substrate 10 and a plurality of LED packages 20 mounted on the substrate 10. At least one color sensor 30 is provided in at least one of the plurality of backlights 100. In an exemplary embodiment, a plate with a relatively high light reflectivity can be used for the reflection plate 300 to reduce light loss.

The optical sheets 400 include a diffusion sheet 410, a polarizing sheet 420 and a luminance enhancing sheet 430. At this time, the diffusion sheet 410 directs light incident from the backlights 100 toward a front surface (e.g., upper surface as illustrated in FIG. 7) of the LCD panel 700, and radiates the light onto the LCD panel 700 while diffusing the light to have a substantially uniform distribution in a relatively wide range. The polarizing sheet 420 functions to change slantly incident light among light incident thereon into substantially vertically radiated light. At least one polarizing sheet 420 may be positioned beneath the LCD panel 700 to change light incident from the diffusion sheet 410 into vertically radiated light. The luminance enhancing sheet 430 transmits light parallel with its own transmission axis and reflects light perpendicular thereto.

In the illustrate embodiment, the mold frame 900 is provided for fixedly supporting the plurality of backlights 100 and the optical sheets 400 within the lower accommodating member 200. Further, the LCD panel 700 is positioned above the mold frame 900. The upper accommodating member 600 is provided above the LCD panel 700 such that the LCD panel 700 does not become disconnected from the mod frame 900 and the LCD.

In an exemplary embodiment, the LED packages may be replaced by mounting a plurality of LED chips in a bare chip state onto a substrate and molding them. Another exemplary embodiment of a backlight having a plurality of LED chips in a bare chip state, a backlight assembly and an LCD having the same will be described below. In the following description of this exemplary embodiment, descriptions of details overlapping with those of the previous exemplary embodiment will be omitted. The following description of this exemplary embodiment can also be applied to the backlight, backlight assembly and LCD of FIGS. 1-7.

Figure 8:
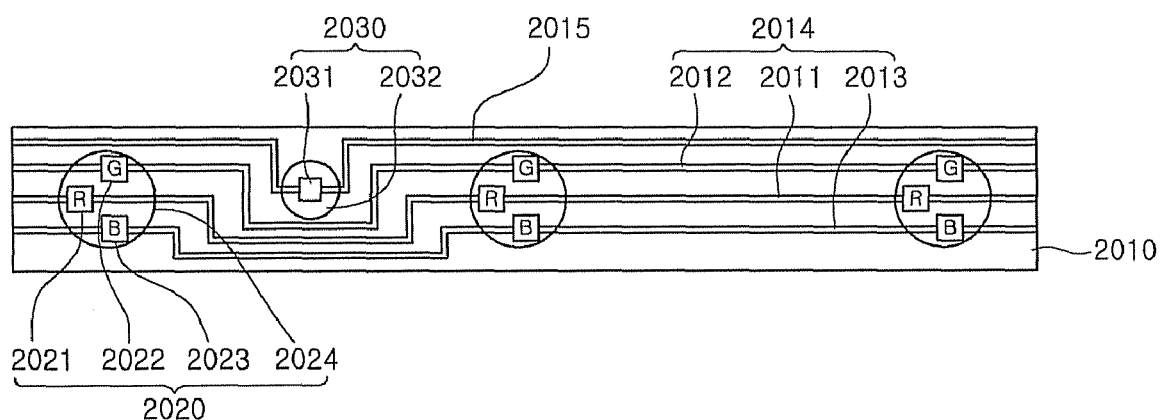
FIG. 8 is a plan view showing another exemplary embodiment of a backlight according to the present invention.
Figure 9:
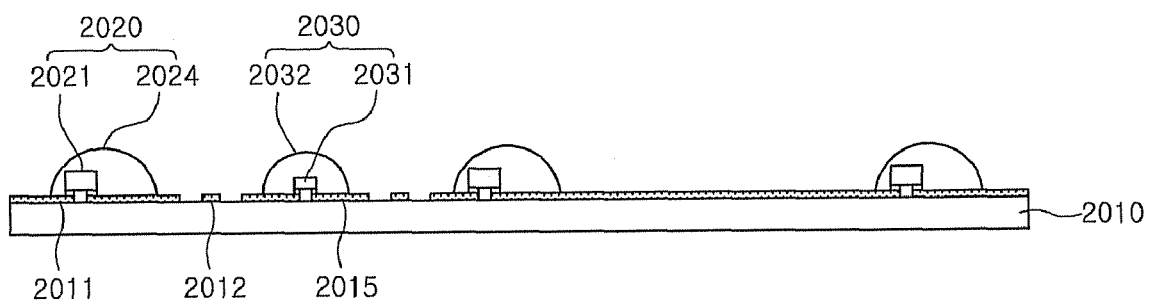
FIG. 9 is cross-sectional view showing the backlight of FIG. 8 according to the present invention.

FIG. 8 is a plan view showing another exemplary embodiment of a backlight according to the present invention, and FIG. 9 is cross-sectional view showing the backlight of FIG. 8 according to the present invention.

Referring to FIGS. 8 and 9, the backlight includes a substrate 2010 provided with first and second wiring portions 2014 and 2015, a plurality of LED chip units 2020 provided on the substrate 2010 and connected electrically to one another through the first wiring portion 2014, and at least one color sensor 2030 provided on the substrate 2010.

Each of the LED chip units 2020 includes bare chip type red, green and blue LED chips 2021, 2022 and 2023, respectively, and a first molding portion 2024 for encapsulating or surrounding the red, green and blue LED chips 2021, 2022 and 2023. The first wiring portion 2014 of the substrate 2010 includes a first red wiring portion 2011, a first green wiring portion 2012 and a first blue wiring portion 2013. The red, green and blue LED chips 2021, 2022 and 2023 are connected to the first red, green and blue wiring portions 2011, 2012 and 2013, respectively. In one exemplary embodiment, each of the red, green and blue LED chips 2021, 2022 and 2023 may be mounted in a flip-chip form on the substrate 2010. The red, green and blue LED chips 2021, 2022 and 2023 may be bonded to the first red, green and blue wiring portions 2011, 2012 and 2013 through bump bonding, respectively.

In one exemplary embodiment, a metallic fine bump substantially taking the form of a ball is formed on a terminal of each of the red, green and blue LED chips 2021, 2022 and 2023. The red, green and blue LED chips 2021, 2022 and 2023 formed with the bumps are positioned on the first red, green and blue wiring portions 2011, 2012 and 2013, respectively. Thereafter, pressurization, heating and/or ultrasonic radiation are performed such that metal bonding is accomplished between the terminals of the red, green and blue LED chips 2021, 2022 and 2023 and the first red, green and blue wiring portions 2011, 2012 and 2013 through the bumps. The red, green and blue LED chips 2021, 2022 and 2023 can be connected electrically to the first red, green and blue wiring portions 2011, 2012 and 2013 of the substrate 2010 through such bump bonding. Further, the mounting area of a chip can be reduced through the bump bonding.

The LED chips 2021, 2022 and 2023 may be connected to the first wiring portion 2014 not only through the bumps of the chips but also through the aforementioned wires.

In an exemplary embodiment, the red, green and blue LED chips 2021, 2022 and 2023 are mounted on the substrate 2010 in such a manner and then molded using a transparent resin. Accordingly, the LED chip unit 2020 is formed on the substrate 2010. In one exemplary embodiment, the red, green and blue LED chips 2021, 2022 and 2023 of the plurality of LED chip units 2020 are connected in series to one another through the first red, green and blue wiring portions 2011, 2012 and 2013, respectively. Alternatively, the red, green and blue LED chips 2021, 2022 and 2023 may be connected in parallel or in series and parallel.

The color sensor 2030 includes a color sensor chip 2031 and a second molding portion 2032 for encapsulating the color sensor chip 2030. In one exemplary embodiment, the color sensor chip 2031 is bonded to the second wiring portion 2015 of the substrate 2010 through bump bonding. The color sensor 2030 may be manufactured by bonding the color sensor chip 2031 and molding the color sensor chip 2031 with a transparent resin.

In an exemplary embodiment, the LED chip unit 2020 and the color sensor 2030 are manufactured through a single mounting and molding process. Accordingly, a process of manufacturing the backlight can be simplified. Alternatively, the LED chip unit 2020 and the color sensor 2030 may be manufactured through separate manufacturing processes. Further, the respective red, green and blue LED chips 2021, 2022 and 2023 of the LED chip unit 2020 may be molded independently.

Hereinafter, a backlight assembly including the aforementioned backlight of FIGS. 8 and 9 and an LCD having the backlight assembly will be described with reference to the accompanying drawings.

Figure 10:
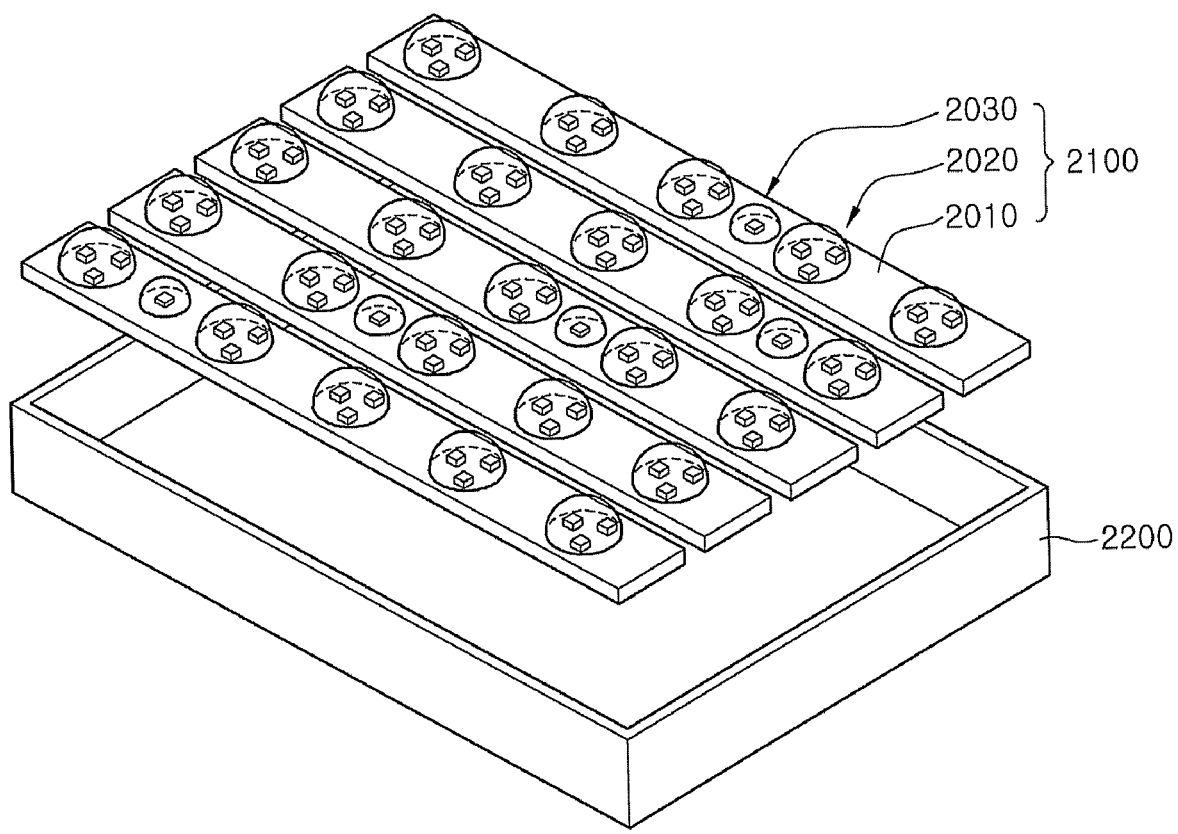
FIG. 10 is an exploded perspective view schematically showing another exemplary embodiment of a backlight assembly according to the present invention.
Figure 11:
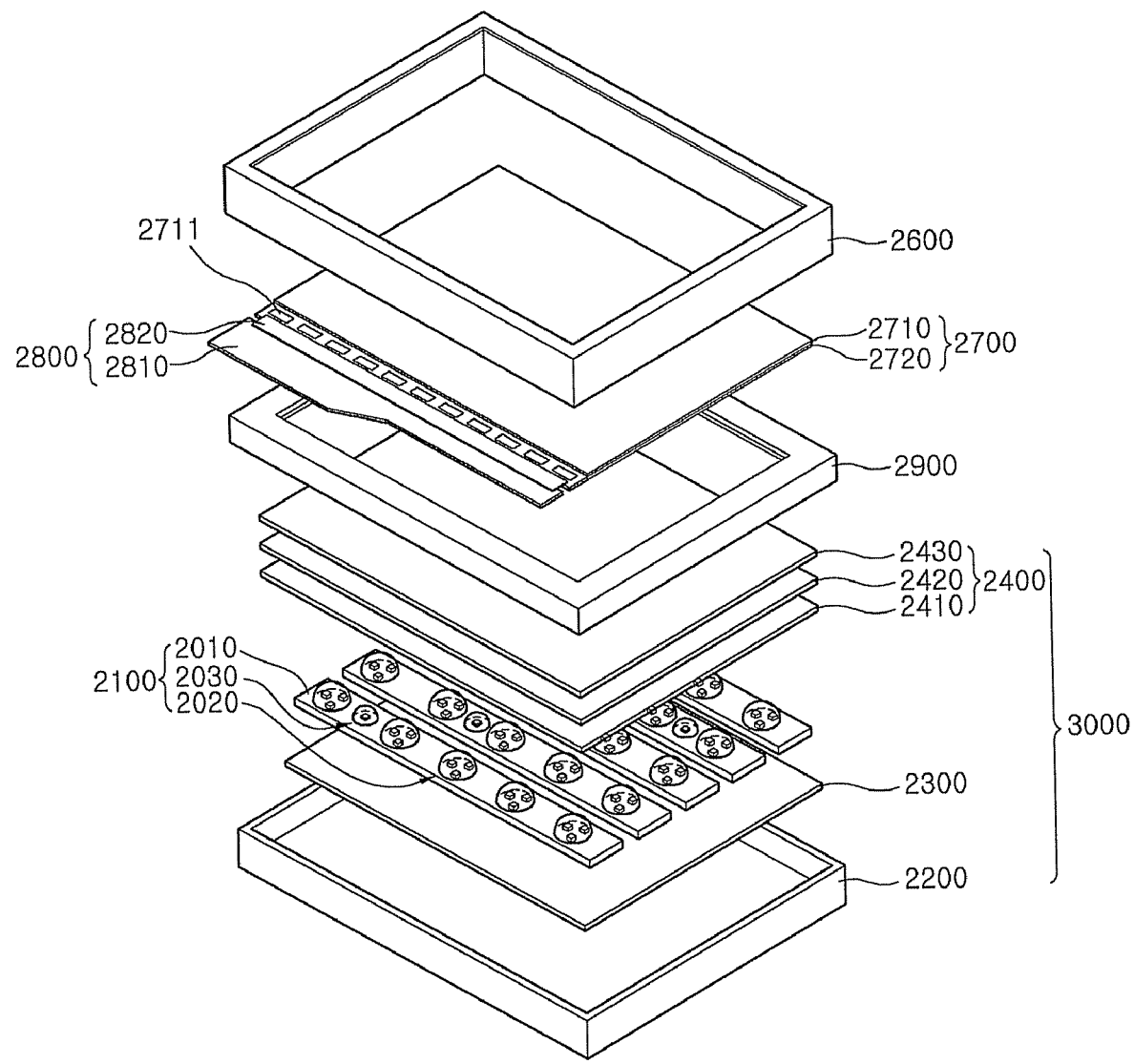
FIG. 11 is an exploded perspective view schematically showing another exemplary embodiment of an LCD according to the present invention.

FIG. 10 is an exploded perspective view schematically showing another exemplary embodiment of a backlight assembly according to the present invention, and FIG. 11 is an exploded perspective view schematically showing an exemplary embodiment of an LCD according to the present invention.

Referring to FIGS. 10 and 11, the LCD includes a backlight assembly 3000, an LCD panel 2700, a mold frame 2900 and an upper accommodating member 2600.

The LCD panel 2700 includes a color filter substrate 2710 and a thin film transistor ("TFT") substrate 2720. A driving circuit unit 2800 is connected to one side of the LCD panel 2700. The driving circuit unit 2800 includes a printed circuit board 2810 for receiving external data signals and power signals applied thereto and a flexible printed circuit board 2820 for making a connection between the printed circuit board 2810 and the LCD panel 2700. A control IC 2711 for applying data signals to data lines is mounted on the TFT substrate 2720 of the LCD panel as shown in FIG. 11.

The backlight assembly 3000 includes a plurality of backlights 2100, a reflection plate 2300 provided beneath the backlights 2100, a plurality of optical sheets 2400 provided above the backlights 2100, and an accommodating member 2200 for accommodating the reflection plate 2300, the plurality of backlights 2100 and the plurality of optical sheets 2400. Alternatively, the reflection plate 2300 may be omitted, if necessary.

As in the illustrated embodiment, each of the backlights 2100 has a substrate 2010 and LED chip units 2020 mounted on the substrate 2010. Each of the LED chip units 2020 includes bare chip type red, green and blue LED chips, and a first molding portion 2024 for molding the LED chips 2020. Further, at least one color sensor 2030 is provided in at least one backlight 2100 among the plurality of backlights 2100. The color sensor 2030 includes a color sensor chip 2031 mounted on the substrate 2010 of the backlight 2100 and a second molding portion 2032 for molding the color sensor chip 2031.

In the illustrated exemplary embodiment, five backlights 2100 are provided and one color sensor 2030 is provided with the five backlights 2100 as shown in FIG. 10. Where the five backlights 2100 are arranged at a predetermined interval as shown in this figure, the color sensors 2030 are arranged in an approximately diagonal direction taken across the multiple backlights 2100. Accordingly, changes in the color temperature and luminance of mixed white light can be detected in substantially an entire region of the backlight assembly 3000. The color sensors 2030 are provided within the plurality of backlights 2100, so that it is possible to constantly control the amount and color temperature of white light in which the red, green and blue light emitted from the LED chip units 2020 of the backlights 2100 are mixed. The amounts of the red, green and blue light within the mixed white light are detected through the color sensors 2030. Power supplied to the red, green and blue LED chips 2021, 2022 and 2023 of the LED chip units 2020 is adjusted according to the detected results of the color sensors 2030, so that the light emitting amounts of red, green and blue light emitted respectively from the red, green and blue LED chips 2021, 2022 and 2023 can be controlled.

In an exemplary embodiment, the LCD may employ a plurality of backlights each of which includes a plurality of chip modules each of which has a color sensor chip together with red, green and blue LED chips mounted on a substrate. Next, another exemplary embodiment of a backlight including chip modules, a backlight assembly and an LCD having the same according to the present invention will be described below. In the following description of the exemplary embodiment, descriptions of details overlapping with those of the previous exemplary embodiments will be omitted. The following description of this exemplary embodiment can also be applied to the backlight, backlight assembly and LCD of FIGS. 1-11.

Figure 12:
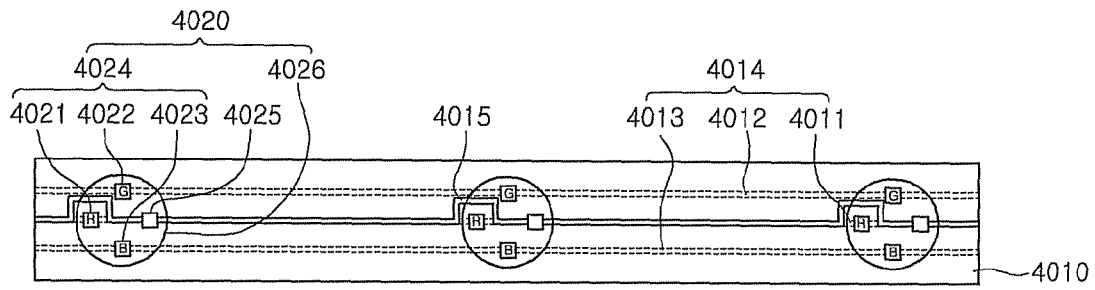
FIG. 12 is a plan view showing another exemplary embodiment of a backlight according to the present invention.
Figure 13:
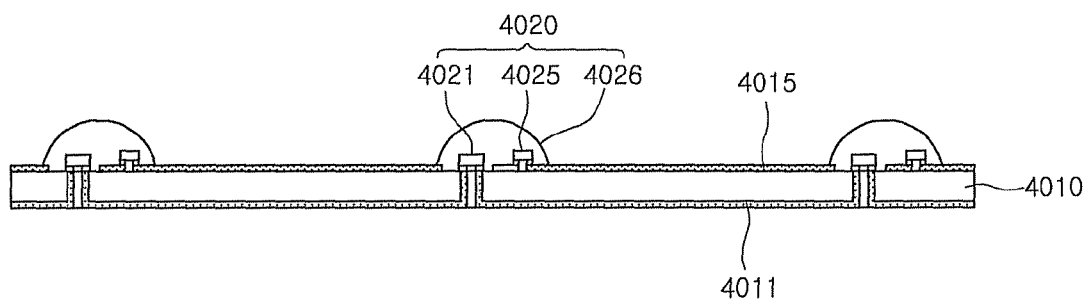
FIG. 13 is a cross-sectional view showing the backlight of FIG. 12 according to the present invention.
Figure 14:
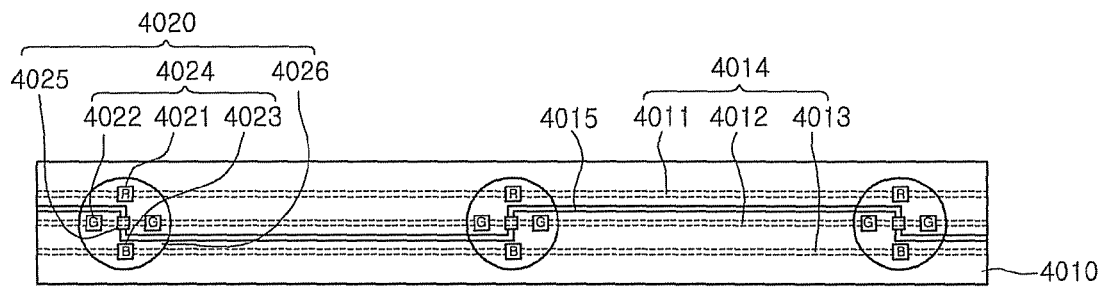
FIG. 14 is a plan view showing an exemplary embodiment of the backlight of FIG. 12 according to the present invention.

FIG. 12 is a plan view showing another exemplary embodiment of a backlight according to the present invention, FIG. 13 is a cross-sectional view showing the backlight of FIG. 12 according to the present invention, and FIG. 14 is a plan view showing another exemplary embodiment of the backlight of FIG. 12 according to the present invention.

Referring to FIGS. 12 to 14, the backlight includes a substrate 4010 provided with first and second wiring portions 4014 and 4015 and a plurality of chip modules 4020 provided on the substrate 4010. Each of the chip modules 4020 includes an LED chip unit 4024 mounted on the substrate 4010 and connected electrically through the first wiring portion 4014, a color sensor chip 4025 connected to the second wiring portion 4015, and a molding portion 4026 for molding the LED chip unit 4024 and the color sensor chip 4025 to the substrate 4010. The molding portion 4026 encloses and surrounds the LED chip unit 4024 and the color sensor chip 4025 on the substrate 4010.

The LED chip unit 4024 includes red, green and blue LED chips 4021, 4022 and 4023 for respectively emitting red, green and blue light. As in the illustrated embodiment, the color sensor chip 4025 is provided within each of all the plurality of chip modules 4020 provided on the substrate 4010. However, the present invention is not limited thereto. Alternatively, the color sensor chip 4025 may be provided within at least one of the chip modules 4020. In other words, the color sensor chip 4025 may not be provided within a portion of the plurality of chip modules 4020.

Referring to FIG. 13, the second wiring portion 4015 is provided on a top (e.g., upper) surface of the substrate 4010 so as to connect the color sensor chips 4025 within the plurality of chip modules 4020 in series and/or in parallel. The present invention is not limited thereto. Alternatively, the respective color sensor chips 4025 provided within the chip modules 4020 may be connected through separate wiring lines from the chip modules 4020. In an exemplary embodiment, the second wiring portion 4015 and the color sensor chips 4025 may be electrically connected through bump bonding or wire bonding. The second wiring portion 4015 and the color sensor chips 4025 may be electrically connected through other various bonding methods suitable for the purpose described herein.

The first wiring portion 4014 is provided on a bottom surface of the substrate 4010, and a portion of the first wiring portion 4014 extends in a direction toward the top surface of the substrate 4010 so that the red, green and blue LED chips 4021, 4022 and 4023 provided within the plurality of chip modules 4020 can be connected to one another in series and/or in parallel. The first wiring portion 4014 includes a first red wiring portion 4011 for electrically connecting the red LED chips 4021 in the plurality of chip modules 4020, a first green wiring portion 4012 for electrically connecting the green LED chips 4022, and a first blue wiring portion 4013 for electrically connecting the blue LED chips 4023. In the illustrated embodiment, the red, green and blue LED chips 4021, 4022 and 4023 are connected in series through the first red, green and blue wiring portions 4011, 4012 and 4013, respectively, as shown in FIG. 12. In one exemplary embodiment, the first red, green and blue wiring portions 4011, 4012 and 4013 may be electrically connected to the red, green and blue LED chips 4021, 4022 and 4023 through bump bonding. Alternatively, the first red, green and blue wiring portions 4011, 4012 and 4013 may be electrically connected to the red, green and blue LED chips 4021, 4022 and 4023 through various bonding methods including wire bonding, as is suitable for the purpose described herein.

In the illustrated embodiment of FIGS. 12 and 13, the chip module is manufactured by mounting the color sensor chip 4025 together with one each of the red, green and blue LED chips 4021, 4022 and 4023 on the substrate 4010 and subsequently molding all the red, green and blue LED chips 4021, 4022 and 4023 and the color sensor chip 4025 with a transparent resin. However, the present invention is not limited thereto and the respective red, green and blue LED chips 4021, 4022 and 4023 and the color sensor chip 4025 may be independently molded.

The chip module 4020 of FIGS. 12 and 13 is not limited thereto but may further include an additional one of green LED chip 4022 as shown in FIG. 14. Alternatively, the chip module 4020 may further include additional red, green and blue LED chips 4021, 4022 and 4023, such that a number of each of the colored LED chips is not equal within the chip module 4020.

In one exemplary embodiment, the color sensor chip 4025, the red and blue LED chips 4021 and 4023, and the two green LED chips 4022 be equidistantly arranged within the chip module 4020 and under the molding portion 4026. As illustrated in FIG. 14, the red and blue LED chips 4021 and 4023 and the two green chips 4022 are arranged in a substantially cross shape while being spaced apart by a certain distance from the center thereof, and the color sensor chip 4025 is positioned at the center of the cross shape. Accordingly, the distance between the color sensor chip 4025 and each of the LED chips 4021, 4022 and 4023 is set to be substantially constant so that the sensing efficiency of the color sensor chip can be maximized. Of course, the present invention is not limited to only the chip module 4020 but may be applied to a case where a color sensor chip is mounted within an LED package (FIG. 1, element 20) including red, green and blue LED chips. In an exemplary embodiment, the color sensor chip may be mounted at the center of the LED package, and the red, green and blue LED chips may be mounted at a predetermined interval around the color sensor chip.

Hereinafter, a backlight assembly including the aforementioned backlight and an LCD having the same will be described with reference to the accompanying drawings.

Figure 15:
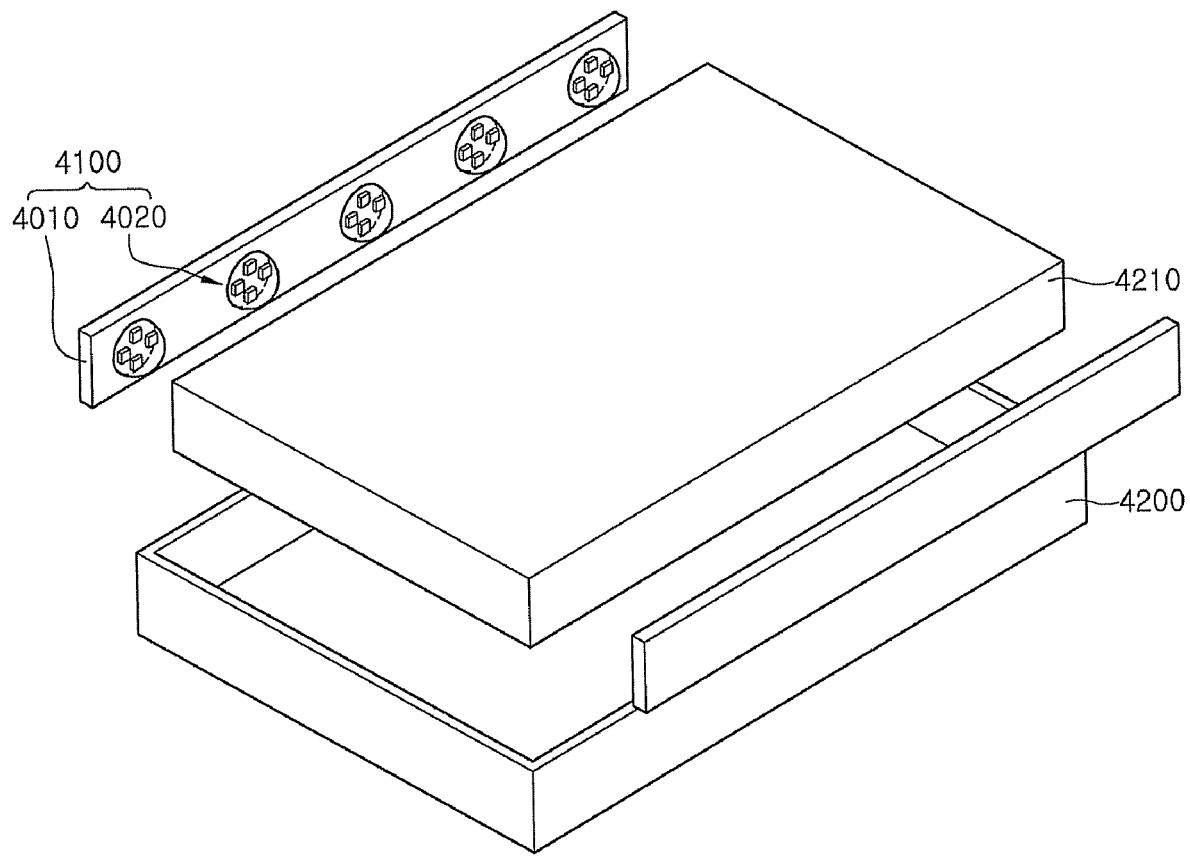
FIG. 15 is an exploded perspective view schematically showing another exemplary embodiment of a backlight assembly according to the present invention.
Figure 16:
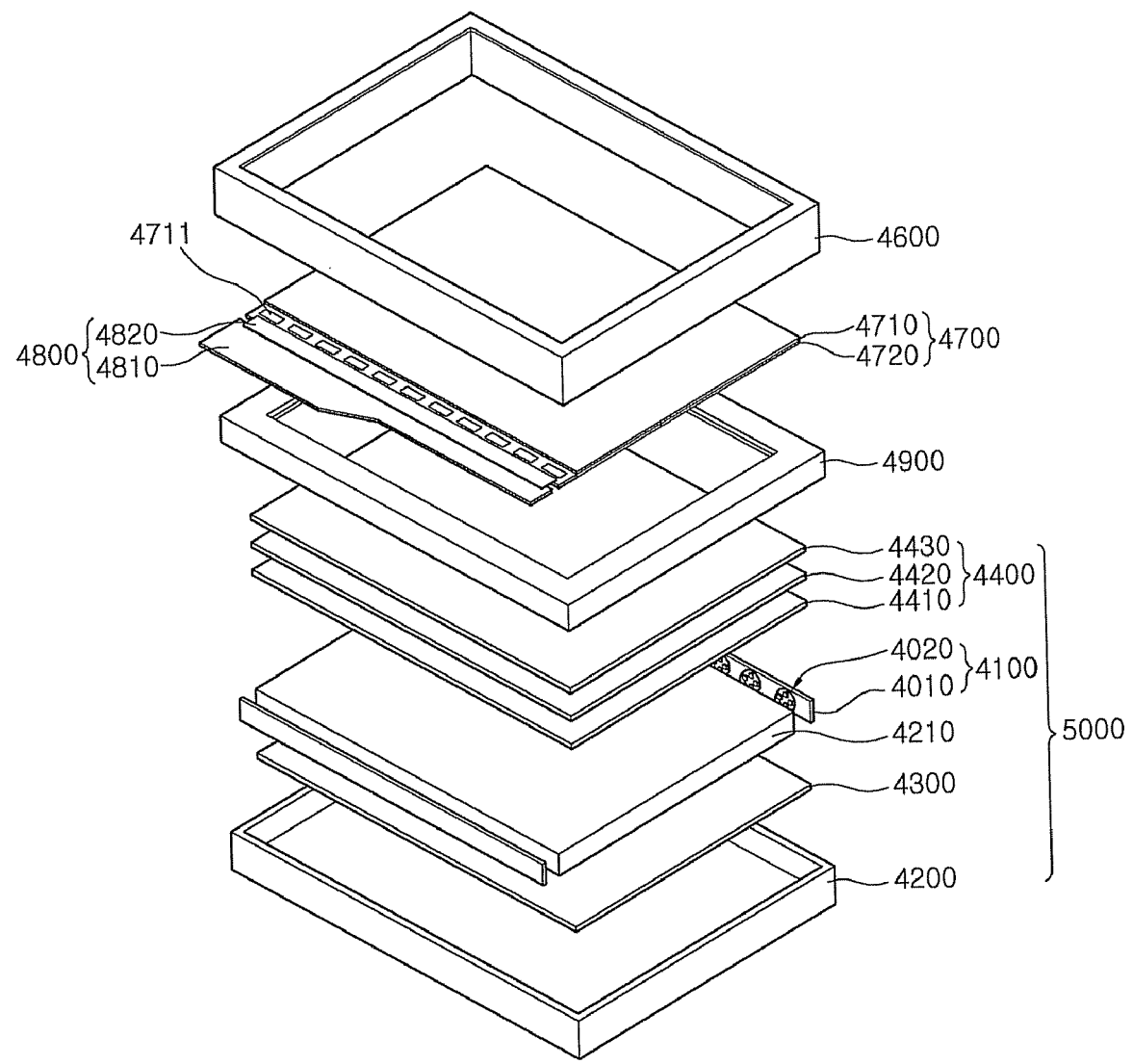
FIG. 16 is an exploded perspective view schematically showing another exemplary embodiment of an LCD according to the present invention.

FIG. 15 is an exploded perspective view schematically showing another exemplary embodiment of a backlight assembly according to the present invention, and FIG. 16 is an exploded perspective view schematically showing another exemplary embodiment of an LCD according to the present invention.

Referring to FIGS. 15 and 16, the LCD includes a backlight assembly 5000, an LCD panel 4700, a mold frame 4900 and an upper accommodating member 4600.

The LCD panel 4700 includes a color filter substrate 4710 and a thin film transistor ("TFT") substrate 4720. A driving circuit unit 4800 is connected to one side of the LCD panel 4700. The driving circuit unit 4800 includes a printed circuit board 4810 for receiving external data signals and power signals applied thereto and a flexible printed circuit board 4820 for making a connection between the printed circuit board 4810 and the LCD panel 4700. A control IC 4711 for applying data signals to data lines is mounted on the TFT substrate 4720 of the LCD panel as shown in FIG. 16.

The backlight assembly 5000 includes a plurality of backlights 4100, a light guide plate 4210 provided at a region adjacent to the backlights 4100, a reflection plate 4300 provided below the light guide plate 4210, a plurality of optical sheets 4400 provided above the light guide plate 4210, and an accommodating member 4200 for accommodating the reflection plate 4300, the light guide plate 4210, the plurality of backlights 4100 and the plurality of optical sheets 4400. Alternatively, the reflection plate 2300 may be omitted.

The light guide plate 4210 is positioned to be adjacent to the backlights 4100 such that light with an optical distribution in the form of a point light source from the backlights 4100 is converted into light with an optical distribution in the form of a surface light source. A wedge-type or parallel flat plate may be used as the light guide plate 4210. In one exemplary embodiment, the light guide plate 4210 may be made of polymethylmethacrylate ("PMMA") which has superior transmittance and high strength such that the light guide plate 4210 cannot be not easily deformed or broken. As in the illustrated embodiment, two backlights 4100 are positioned adjacent to opposing sides of the light guide plate 4210, such as longitudinal sides. Alternatively, more or less than two of the backlights 4100 may be used as is suitable for the purpose described herein.

Each of the backlights 4100 includes a substrate 4010 and a plurality of chip modules 4020 formed thereon. Each of the plurality of chip modules 4020 includes red, green and blue LED chips 4021, 4022 and 4023 and a color sensor chip 4025 mounted on the substrate 4010, and a molding portion 4026 for molding the red, green and blue LED chips 4021, 4022 and 4023 and the color sensor chip 4025.

The chip module 4020 emits white light in which red, green and blue light emitted respectively from the red, green and blue LED chips 4021, 4022 and 4023 is mixed. Since the color sensor chip 4025 is positioned within the chip module 4020 in this exemplary embodiment, the amount and color temperature of mixed white light emitted from the chip module can be constantly maintained.

As in the illustrated embodiments, a color sensor chip is mounted on a substrate with LED packages or LED chips mounted thereon and is then molded to form a color sensor, so that the color sensor can be formed freely within a light source without any limitation on a mounting space.

As in the illustrated embodiments, LED chips of a light source and a color sensor chip are mounted through a single mounting process and then molded, thereby simplifying a manufacturing process and enhancing productivity.

Furthermore, as in the illustrated embodiments, white light in which red, green and blue light is mixed is sensed by a color sensor, and power supplied to LED chips is controlled in accordance with the sensed results, thereby constantly maintaining the luminance and color temperature of the white light.

Although the present invention has been described in connection with the exemplary embodiments and the drawings, it is not limited thereto. The scope of the present invention is defined by the appended claims. Thus, it will be apparent to those skilled in the art that various changes and modifications can be made thereto without departing from the technical spirit and scope of the invention defined by the appended claims.

What is claimed is:

1. A backlight comprising:
    a substrate with a plurality of wiring provided thereon;
    a plurality of LED modules disposed on the substrate; and
    at least one color sensor including a color sensor chip mounted on the substrate and a molding portion enclosing the color sensor chip alone,
    wherein the plurality of wiring includes:
        a first wiring electrically connecting the LED modules to each other, and
        a second wiring separated from the first wiring and electrically connected to the color sensor chip, and
    wherein
    the first wiring is disposed on a first surface of the substrate, and the second wiring is disposed on a second surface of the substrate, opposed to the first surface,
    the plurality of LED modules are connected in series to one another through the first wiring,
    the color sensor chip comprises red, green and blue light sensing portions sensing red, green and blue light, respectively, and
    at least one color sensor chip is mounted between adjacent LED modules in every row of the LED modules.

2. The backlight of claim 1, wherein the color sensor chip is electrically connected to the second wiring through wire bonding or bump bonding.

3. The backlight of claim 1, wherein the color sensor chip comprises red, green and blue light sensing portions sensing red, green and blue light, respectively.

4. The backlight of claim 1, wherein each of the LED modules comprises:
    at least one red, green and blue LED chips;
    a housing including the red, green and blue LED chips mounted therein; and
    a plurality of lead terminals connected to the red, green and blue LED chips, and extending outside the housing to be electrically connected to the plurality of wiring of the substrate.

5. The backlight of claim 1, wherein each of the LED modules comprises:
    at least one red, green and blue LED chip mounted on the substrate; and
    an LED chip molding portion enclosing the red, green and blue LED chips.

6. A backlight comprising:
    a substrate with a plurality of wiring provided thereon; and
    a plurality of chip modules disposed on the substrate,
    wherein each of the chip modules comprises:
        an LED chip unit including red, green and blue LED chips mounted on the substrate;
        a color sensor chip mounted on the substrate; and
        a molding portion enclosing and securing the LED chip unit and the color sensor chip with the substrate,
    wherein the plurality of wiring includes:
        a first wiring electrically connecting the red LED chips to each other,
        a second wiring electrically connecting the green LED chips to each other,
        a third wiring electrically connecting the blue LED chips to each other, and
        a fourth wiring electrically connected to the color sensor chip, and
    wherein
    the first, second and third wiring are disposed on a first surface of the substrate, and the fourth wiring is disposed on a second surface of the substrate, opposed to the first surface,
    portions of the fourth wiring which are adjacent to the LED chip unit, are bent, and
    the portions of the fourth wiring are in the molding portion.

7. The backlight of claim 6, wherein the red, green and blue LED chips and the color sensor chip are mounted on the substrate through wire bonding or bump bonding.

8. The backlight of claim 6, wherein the red, green and blue LED chips and the color sensor chip are arranged in a substantially cross shape.

9. The backlight of claim 6, wherein the red and blue LED chips and two green chips are arranged in a substantially cross shape and the color sensor chip is positioned at the center of the cross shape.

10. A liquid crystal display ("LCD") comprising:
    an LCD panel displaying images thereon; and
    a backlight assembly emitting light onto the LCD panel,
    wherein
    the backlight assembly includes a plurality of backlights, each of the backlights including a substrate with a plurality of wiring provided thereon and a plurality of LED modules emitting light disposed on the substrate, and
    at least one color sensor including a color sensor chip disposed on the substrate and a molding portion enclosing the color sensor chip alone, the color sensor being disposed in at least one of the plurality of backlights,
    wherein the plurality of wiring includes:

a first wiring electrically connecting the LED modules to each other; and a second wiring separated from the first wiring and electrically connected to the color sensor chip, and wherein the first wiring is disposed on a first surface of the substrate, and the second wiring is disposed on a second surface of the substrate, opposed to the first surface, the plurality of LED modules are connected in series to one another through the first wiring, the color sensor chip comprises red, green and blue light sensing portions sensing red, green and blue light, respectively, and at least one color sensor chip is mounted between adjacent LED modules in every row of the LED modules.

11. The liquid crystal display of claim 10, wherein the molding portion further encloses the LED module.

12. A method of forming a backlight assembly for a liquid crystal display, the method comprising:

forming a plurality of backlights, each of the backlights including a substrate, a first wiring, a second wiring separated for the first wiring, and a plurality of LED modules emitting light and electrically connected to each other through the first wiring;

forming a color sensor including a color sensor chip, which is electrically connected to the second wiring and mounted on the substrate, and a molding portion enclosing the color sensor chip alone;

disposing a color sensor on at least one of the plurality of backlights; and receiving the plurality of backlights into an accommodating member, wherein the first wiring is disposed on a first surface of the substrate, and the second wiring is disposed on a second surface of the substrate, opposed to the first surface, the plurality of LED modules are connected in series to one another through the first wiring, the color sensor chip comprises red, green and blue light sensing portions sensing red, green and blue light, respectively, and at least one color sensor chip is mounted between adjacent LED modules in every row of the LED modules.

13. The method of claim 12, wherein the forming of the color sensor comprises enclosing an LED module with the molding portion.

14. The method of claim 12, wherein the forming of the plurality of backlights comprises disposing the plurality of LED modules on the substrate and disposing the color sensor through a single mounting process.

15. The method of claim 12, further comprises connecting a power supply to the LED modules, the power supply being configured to supply power to the LED modules, and connecting a controller to the power supply, the controller being configured to change the supply of power to the LED modules depending on an output of the color sensor.

* * * * *